(12) United States Patent
Tamada

(10) Patent No.: US 11,788,662 B2
(45) Date of Patent: Oct. 17, 2023

(54) FLUID CONTROL DEVICE

(71) Applicant: COSMO KOKI CO., LTD., Tokyo (JP)

(72) Inventor: Satoshi Tamada, Tokyo (JP)

(73) Assignee: COSMO KOKI CO., LTD.

( * ) Notice: Subject to any disclaimer, the term of this patent is extended or adjusted under 35 U.S.C. 154(b) by 0 days.

(21) Appl. No.: 17/283,944

(22) PCT Filed: Nov. 18, 2019

(86) PCT No.: PCT/JP2019/045055
§ 371 (c)(1),
(2) Date: Apr. 8, 2021

(87) PCT Pub. No.: WO2020/137247
PCT Pub. Date: Jul. 2, 2020

(65) Prior Publication Data
US 2021/0381636 A1    Dec. 9, 2021

(30) Foreign Application Priority Data

Dec. 26, 2018 (JP) .................................. 2018-242368

(51) Int. Cl.
*F16L 55/105* (2006.01)
*F16K 1/22* (2006.01)
*F16K 27/02* (2006.01)

(52) U.S. Cl.
CPC .............. *F16L 55/105* (2013.01); *F16K 1/22* (2013.01); *F16K 27/0218* (2013.01)

(58) Field of Classification Search
CPC ........ F16K 1/22; F16K 1/221; F16K 27/0218; F16L 55/105; F16L 55/1018
See application file for complete search history.

(56) References Cited

U.S. PATENT DOCUMENTS

| 2,940,725 | A | * | 6/1960 | Nagel | .................. F16K 5/0673 |
| | | | | | 251/317 |
| 3,306,316 | A | * | 2/1967 | Stillwagon | ................ F16K 1/22 |
| | | | | | 137/527.6 |
| 3,894,718 | A | * | 7/1975 | Koch | .................... F16K 5/0694 |
| | | | | | 251/174 |

(Continued)

FOREIGN PATENT DOCUMENTS

| CA | 2692954 | 4/2010 | ............ F16L 55/105 |
| DE | 29801734 | 4/1998 | .............. F16L 41/06 |

(Continued)

OTHER PUBLICATIONS

KR200337352Y1, Machine Translation (Year: 2004).*

(Continued)

*Primary Examiner* — Daphne M Barry
(74) *Attorney, Agent, or Firm* — HAYES SOLOWAY P.C.

(57) ABSTRACT

A fluid control device has a partition body formed by a wall portion that is provided with a through hole communicating with an opening portion in a valve seat, the wall portion being mounted on the valve seat body in a sealed manner, and a lid portion which is provided continuously to the wall portion, the lid portion covering an opening side of the casing, the partition body including a seal component that seals a gap between an inner surface of a casing and the partition body.

10 Claims, 13 Drawing Sheets

(56) References Cited

U.S. PATENT DOCUMENTS

| | | | | |
|---|---|---|---|---|
| 5,145,150 A * | 9/1992 | Brooks | | F16K 5/204 |
| | | | | 251/188 |
| 5,430,932 A | 7/1995 | MacLaggan | | F16L 41/06 |
| 5,620,020 A | 4/1997 | Collins | | F16L 55/105 |
| 6,776,184 B1 * | 8/2004 | Maichel | | F16L 55/105 |
| | | | | 251/327 |
| 9,297,487 B2 | 3/2016 | Borland | | F16L 41/16 |
| 2004/0117986 A1 * | 6/2004 | Eklof | | F16K 5/0621 |
| | | | | 29/890.131 |
| 2005/0150550 A1 * | 7/2005 | Maichel | | F16K 27/0218 |
| | | | | 137/320 |
| 2008/0000353 A1 * | 1/2008 | Rarig | | F16K 11/085 |
| | | | | 96/124 |
| 2010/0229962 A1 * | 9/2010 | Frenzel | | F16K 5/0673 |
| | | | | 251/315.1 |
| 2011/0017932 A1 * | 1/2011 | Domingues Matos | | |
| | | | | B29C 45/14754 |
| | | | | 264/250 |
| 2013/0200286 A1 * | 8/2013 | Eagen | | F16K 5/0642 |
| | | | | 251/315.1 |
| 2014/0374638 A1 * | 12/2014 | Gerceker | | F16K 27/0218 |
| | | | | 251/305 |
| 2015/0101684 A1 * | 4/2015 | Yoder | | F16K 35/06 |
| | | | | 137/385 |
| 2015/0292627 A1 * | 10/2015 | Yamada | | F16K 1/226 |
| | | | | 251/305 |
| 2020/0049259 A1 | 2/2020 | Yokoyama et al. | | F16K 1/226 |
| 2022/0074518 A1 * | 3/2022 | Wang | | F16K 27/067 |

FOREIGN PATENT DOCUMENTS

| | | | | |
|---|---|---|---|---|
| EP | 0935088 | 8/1999 | | F16L 41/04 |
| EP | 1 045 182 | 10/2000 | | F16K 27/02 |
| GB | 1077383 | 7/1967 | | |
| GB | 2465310 | 5/2010 | | F16K 43/00 |
| GB | 2472265 | 2/2011 | | F16K 43/00 |
| JP | 49-126228 | 10/1974 | | |
| JP | 64-38365 | 3/1989 | | F16K 5/06 |
| JP | 5-52270 | 3/1993 | | F16K 3/02 |
| JP | 2006-153178 | 6/2006 | | F16L 55/00 |
| JP | 2006250295 | 9/2006 | | F16L 55/00 |
| JP | 2006-292001 | 10/2006 | | F16L 55/00 |
| JP | 2006275109 | 10/2006 | | F16L 55/00 |
| JP | 2014-119012 | 6/2014 | | F16K 43/66 |
| JP | 2017-172591 | 9/2017 | | F16K 37/00 |
| KR | 200337352 Y1 * | 1/2004 | | |
| KR | 10-1938518 | 4/2019 | | F16K 1/22 |
| WO | WO 2018/168339 | 9/2018 | | F16K 1/226 |

OTHER PUBLICATIONS

International Search Report (w/ English translation) and Written Opinion issued in PCT/JP2019/045055, dated Jan. 28, 2020, 9 pages.
Office Action issued in Singapore Patent Appln. Serial No. 11202103535V, dated Feb. 24, 2022, 10 pages.
International Preliminary Report on Patentability issued in PCT/JP2019/045055, dated Jul. 8, 2021, 7 pages.
Examination Report No. 1 issued in Australian Patent Appln. 2021202638, dated May 16, 2022, 8 pages.
Examination Report No. 1 issued in Australian Patent Appln. Serial No. 2019412926, dated May 16, 2022, 7 pgs.
Office Action issued in Canadian Patent Appln. Serial No. 3,115,181, dated Jun. 30, 2022, 3 pages.
U.S. Official Action dated Jun. 9, 2022 issued in related U.S. Appl. No. 17/307,939, 12 pages.
European Search Report issued in related EP Application Serial No. 19901767.4, dated Aug. 19, 2022, 7 pages.
Taiwan Official Action issued in related application Serial No. 110116786, dated Jul. 18, 2022, 13 pages with translation.
New Zealand Official Action issued in related Application Serial No. 774914, dated Mar. 23, 2023, 4 pages.
Philippines Official Action issued in related Application Serial No. 1-2021-550769, dated Apr. 13, 2023, 5 pages.

* cited by examiner

FLUID CONTROL DEVICE

TECHNICAL FIELD

The present invention relates to a fluid control device in which a fluid control body is installed in a casing that seals a fluid pipe in an uninterrupted flow state.

BACKGROUND ART

There is a conventional fluid control device in which part of a fluid pipe forming a fluid pipe passage is cut off in a casing fitted onto the fluid pipe in a sealed manner in an uninterrupted flow state, and a fluid control body such as various valves for controlling a fluid in a pipe is installed at the cut-off point. For example, as shown in Patent Citation 1, there is a known fluid control device in which by attaching a casing to a fluid pipe in a sealed manner, attaching a process valve capable of opening/closing the inside of the casing to an opening portion of this casing, setting a cutting machine having a hole saw and a drive portion on the process valve, letting the hole saw go forward by the drive portion in a state where the process valve is opened, cutting off part of the fluid pipe in the casing in an uninterrupted flow state, attaching an inserting machine to the process valve in place of the cutting machine, and letting the fluid control body go forward by the inserting machine, the fluid control body is installed in a sealed manner in the casing via the opening portion in an uninterrupted flow state.

As the fluid control body forming such a fluid control device, Patent Citation 1 shows a valve main body (fluid control body) formed mainly by an upper lid portion (lid portion) including a seal component which is closely connected to an inner peripheral surface on the opening portion side of the casing, a partition wall (wall portion) integrated with a lower portion of this upper lid portion, the partition wall including a seal component which is closely connected to an inner side surface and a bottom surface of the casing, and a valve element to be operated in such a manner that the opening portion formed to pass through this partition wall is openable/closable.

CITATION LIST

Patent Literature

Patent Citation 1: JP 2006-153178 A (Page 5, FIG. 2)

SUMMARY OF INVENTION

Technical Problem

However, in Patent Citation 1, the fluid control body installed inside the casing which is fitted onto the fluid pipe is required to have an outer surface of an elaborate shape which is matched with and closely connected to an inner surface of the casing in which the fluid control body is installed. Thus, there is a need for separately designing details of the fluid control body including the lid portions and wall portions having outer surfaces of such an elaborate shape and further including the valve element that opens/closes the opening portion of this partition wall by desired control properties. Therefore, there is a problem that not only a process of manufacturing the fluid control body becomes complicated but also manufacturing cost is increased. In particular, depending on a region where a component building a pipeline such as a pipe and a fluid control body is laid, there are differences in specifications and standards such as pressure, coating, and materials, of a fluid pipe and a fluid control body. When details of the fluid control body are separately designed and manufactured according to the differences, the cost becomes enormous and there is also a problem that storage and maintenance of a specific fluid control body become complicated.

The present invention is achieved focusing on such problems, and an object thereof is to provide a fluid control device with which processes of designing, manufacturing, and managing a fluid control body are simplified to suppress cost of manufacturing, etc., and desired control properties are provided.

Solution to Problem

In order to solve the problems described above, a fluid control device according to the present invention is a fluid control device including a fluid control body that controls a fluid in a pipe, the fluid control body being installed in a sealed manner inside a casing which is externally fitted onto a fluid pipe in a sealed manner at a point where part of the fluid pipe is cut off in an uninterrupted flow state, wherein the fluid control body includes an on-off valve formed by a valve seat body which includes an opening portion and a valve element which is provided in the valve seat body in such a manner that the opening portion is openable and closable, and a partition body formed by a wall portion that is provided with a through hole communicating with the opening portion, the wall portion being mounted on the valve seat body in a sealed manner, and a lid portion which is provided continuously to the wall portion, the lid portion covering an opening side of the casing, the partition body including a seal component that seals a gap between an inner surface of the casing and the partition body.

According to this feature of the present invention, as the fluid control body installed in the casing which is externally fitted onto the fluid pipe in a sealed manner, the on-off valve formed by the valve seat body and the valve element that opens/closes the opening portion, and the partition body formed by the wall portion which is mounted on the valve seat body and the lid portion covering an opening of the casing, the partition body including the seal component that seals the part from the inner surface of this casing are formed separately from each other. Thus, without requiring a fluid control body whose details are designed and manufactured according to a shape of the casing, it is possible to adopt a standardized or commercialized product which is highly versatile as an on-off valve and has desired fluid control properties, and also to hold a sealing property in the casing by the partition body placed between this on-off valve and the inner surface of the casing. The partition body is formed by the wall portion enclosing the opening portion of the valve seat body and the lid portion provided continuously to this wall portion. Thus, structural strength and rigidity of the partition body are enhanced and it is possible to maintain the sealing property against pressure fluctuation and flow rate fluctuation of the fluid in the pipe.

The wall portion is formed a pair of wall portions may be mounted to sandwich the valve seat body in an axis direction of the fluid pipe. According to this feature, by letting the pair of wall portions approach to sandwich the valve seat body of the on-off valve in the pipe axis direction, it is possible to easily mount these wall portions.

The lid portion may be provided continuously to each of the pair of wall portions. According to this feature, by letting the pair of wall portions approach to sandwich the valve seat body of the on-off valve in the pipe axial direction, it is possible to easily form as the partition body.

An axial hole through which a neck portion of the fluid control body is inserted may be formed in the lid portion. According to this feature, by the neck portion inserted through to the outside of the casing via the axial hole, it is possible to operate the valve element in the casing to open/close.

The lid portion is mounted to sandwich the neck portion in an axial direction of the fluid, and by connecting the lid portions in the axial direction, the axial hole may be formed. According to this feature, by letting the pair of lid portions approach to sandwich the neck portion in the axial direction, it is possible not only to easily mount these lid portions but also to align the pair of lid portions with respect to each other by utilizing the neck portion.

A sealing member that seals the opening portion so as to enclose the opening portion may be disposed between the valve seat body and the wall portion. According to this feature, by blocking a flow of the fluid between the valve seat body and the wall portion by the sealing member enclosing the opening portion and by installing the fluid control body in the casing, it is possible to prevent corrosion in an outside region excluding an inside region formed as a flow passage.

BRIEF DESCRIPTION OF DRAWINGS

FIG. 6 is a view showing a butterfly valve forming the fluid control body.

FIG. 7 is a view showing a partition body forming the fluid control body.

FIG. 9 is a view showing a modified example of the fluid control body.

FIG. 10 is a view showing a state where a fluid control body in a second embodiment of the present invention is installed in a casing.

FIG. 11 is a view showing a partition body in the second embodiment.

FIG. 12 is a view showing a state where a fluid control body in a third embodiment of the present invention is installed in a casing.

DESCRIPTION OF EMBODIMENTS

Modes for carrying out a fluid control device according to the present invention will be described below based on embodiments.

First Embodiment

A fluid control device according to a first embodiment will be described with reference to FIGS. 1 to 9. In the present embodiment, a series of flows of fitting a casing 2 on an already-installed fluid pipe 1 forming a component building a pipeline in a sealed manner, cutting off a predetermined point of the fluid pipe 1 in the casing 2 by a cutting machine 5, and installing a fluid control body 10 according to the present invention at the cut point in an uninterrupted flow state to form the fluid control device will be described. The fluid control device of the present embodiment is formed mainly by the fluid control body 10 and the casing 2 as shown in FIG. 3.

Figure 1:
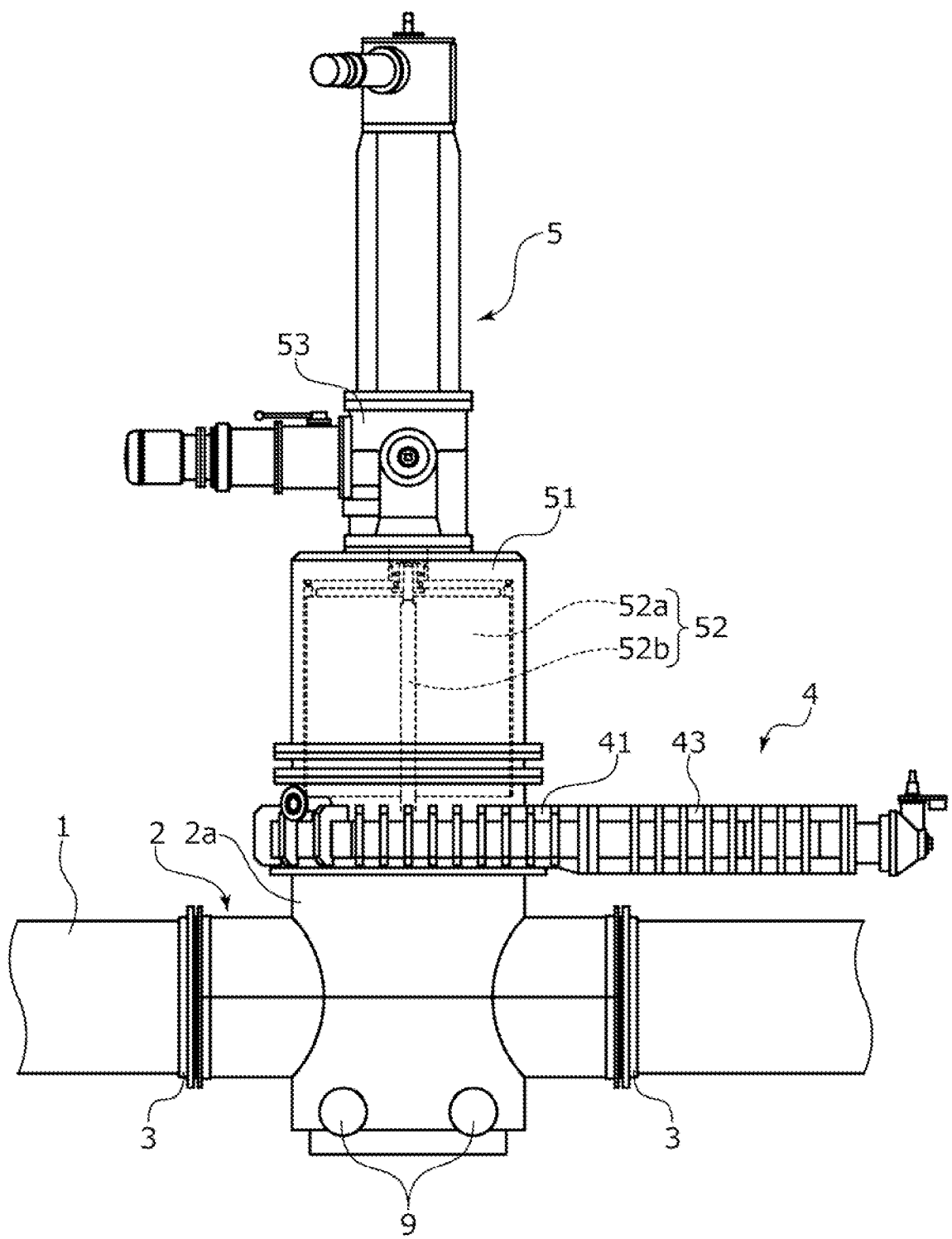
FIG. 1 is a front view showing a state where a process valve and a cutting machine are attached to a casing in a first embodiment of the present invention.

As shown in FIG. 1, for example, a periphery of the predetermined point of the fluid pipe 1 embedded in the ground is dug up, and the casing 2 of an up-down evenly-divided structure, the casing having a branch portion 2a which opens upward and communicates with the inside is fitted on to surround the point in a sealed manner. A fluid in the fluid pipe 1 may be, for example, clean water, industrial water, sewer, etc., and in addition, a gas, or a gas-liquid mixture. Further, although the casing 2 has the evenly-divide structure in the present embodiment, the casing may have other severally-divided structures. Although bonding of divided casings is welding in the present embodiment, the present invention is not limited to this but the divided casings may be attached by bolts via a packing, for example.

The fluid pipe 1 is a ductile cast iron pipe formed in a substantially circular shape in a sectional view. The fluid pipe according to the present invention may be made of metal such as other cast irons or steels, concrete, vinyl chloride, polyethylene, polyolefin, etc. Further, an inner peripheral surface of the fluid pipe may be coated with an epoxy resin layer, mortar, plating, etc., or the inner peripheral surface of the fluid pipe may be coated with an appropriate material by powder coating.

In the present embodiment, the fluid pipe 1 and both ends of the casing 2 in the pipe axis direction are connected by circumferentially-divided pressing rings 3 each of which includes a packing 3a and a locking member 3b in a state where a sealing property and quake resistance are provided. Further, by appropriately screwing plural centering bolts 2h provided in the casing 2 along the circumferential direction of the fluid pipe 1, it is possible to center the casing 2 with respect to the fluid pipe 1. At the time of attaching the casing 2 to the fluid pipe 1 in a sealed manner, a foundation component (not shown) such as concrete foundation or a jack may be formed on the lower side of the casing 2 to support weight around the casing 2 and prevent bend of the fluid pipe 1, etc.

Next, as shown in FIG. 1, a process of cutting off the fluid pipe 1 in the casing 2 by the cutting machine 5 will be described. First, a process valve 4 capable of opening/closing an opening of the casing 2 is attached to a flange portion 2b of the branch portion 2a positioned on the opening side of the casing 2. The process valve 4 is formed mainly by a valve box 41 connected to the branch portion 2a of the casing 2 in a sealed manner in a communicated state, a valve lid 43 connected to the side of this valve box 41 in a sealed manner in a communicated state, and a valve element (not shown) slidably arranged over the inside of the valve box 41 and the inside of the valve lid 43.

That is, the process valve 4 has a structure of closing the casing 2 in a sealed manner when the valve element is positioned in the valve box 41, and opening the casing 2 when the valve element is positioned in the valve lid 43.

The cutting machine 5 for cutting off the fluid pipe 1 is installed on the upper side of the process valve 4. The cutting machine 5 is formed mainly by an attachment flange cylinder 51 connected to the valve box 41 via a short pipe in a sealed manner in a communicated state, the attachment flange cylinder passing through in the up and down direction, a cutter 52 arranged in this attachment flange cylinder 51, and a drive mechanism 53 for moving this cutter 52 in the up and down direction and driving and rotating the cutter 52 in the circumferential direction.

Further, the cutter 52 provided in the cutting machine 5 of the present embodiment is formed as a so-called hole saw, and formed by a cylindrical member 52a having a larger diameter than that of the fluid pipe 1 and including a cutting blade at a lower end, and a center drill 52b arranged coaxially to this cylindrical member 52a, the center drill projecting on the front side of a boring blade. The cylindrical member 52a and the center drill 52b are fixed to each other.

In the present embodiment, as cutting means of the fluid pipe 1, a so-called hole saw is formed. However, the present invention is not limited to this but for example a cut-off tool, a wire saw, an end mill, etc. may be used. At that time, in a case where the cutting machine is a cut-off tool, a structure in which a sprocket, a chain, etc. is driven and rotated in the circumferential direction of the pipe, or in a case where the cutting machine is an end mill, a structure in which the casing 2 is moved in the axial direction or the circumferential direction may be adopted with the known methods. In the present embodiment, the fluid pipe 1 is cut off to be divided in the pipe axis direction. However, the present invention is not limited to this. The fluid pipe 1 may not be divided in the pipe axis direction but bored a part of a pipe wall.

Next, although not particularly shown in the figures, the valve element of the process valve 4 is retreated into the valve lid 43 and the branch portion 2a is opened, and fluid pipe 1 is cut off in an uninterrupted flow state while driving and rotating the cutter 52 and letting the cutter 52 go downward by the drive mechanism 53 with using the cutting machine 5 described above.

Figure 2:
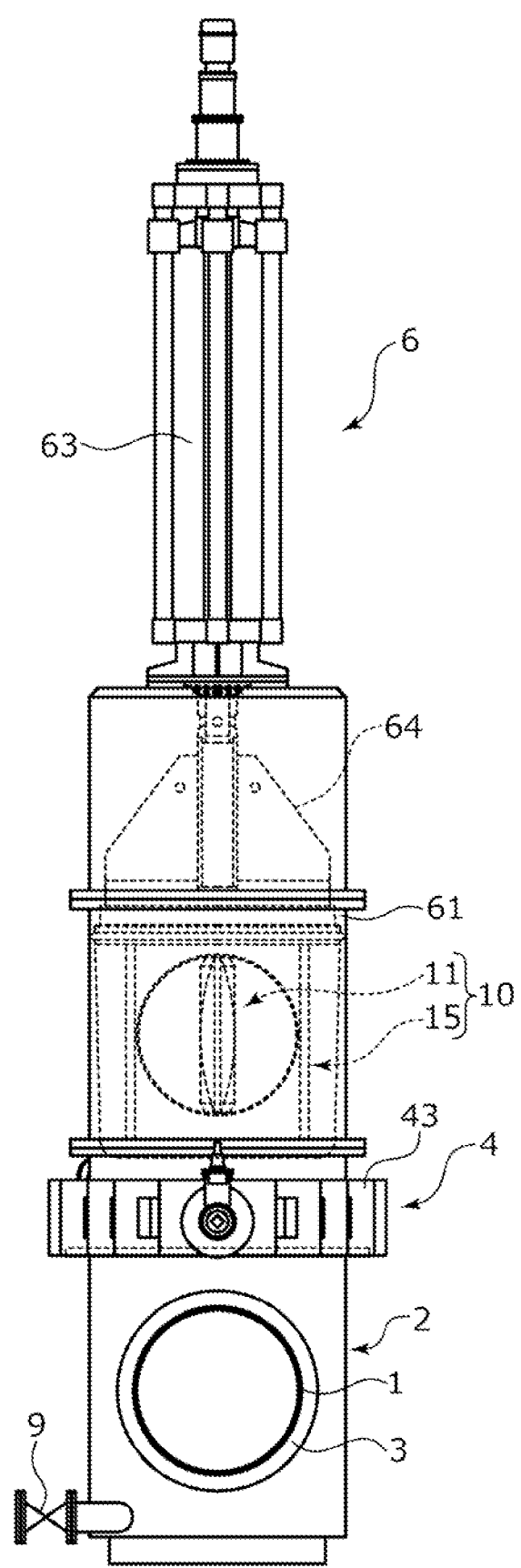
FIG. 2 is a side view showing a state where an inserting machine including a fluid control body is attached to the casing.
Figure 3:
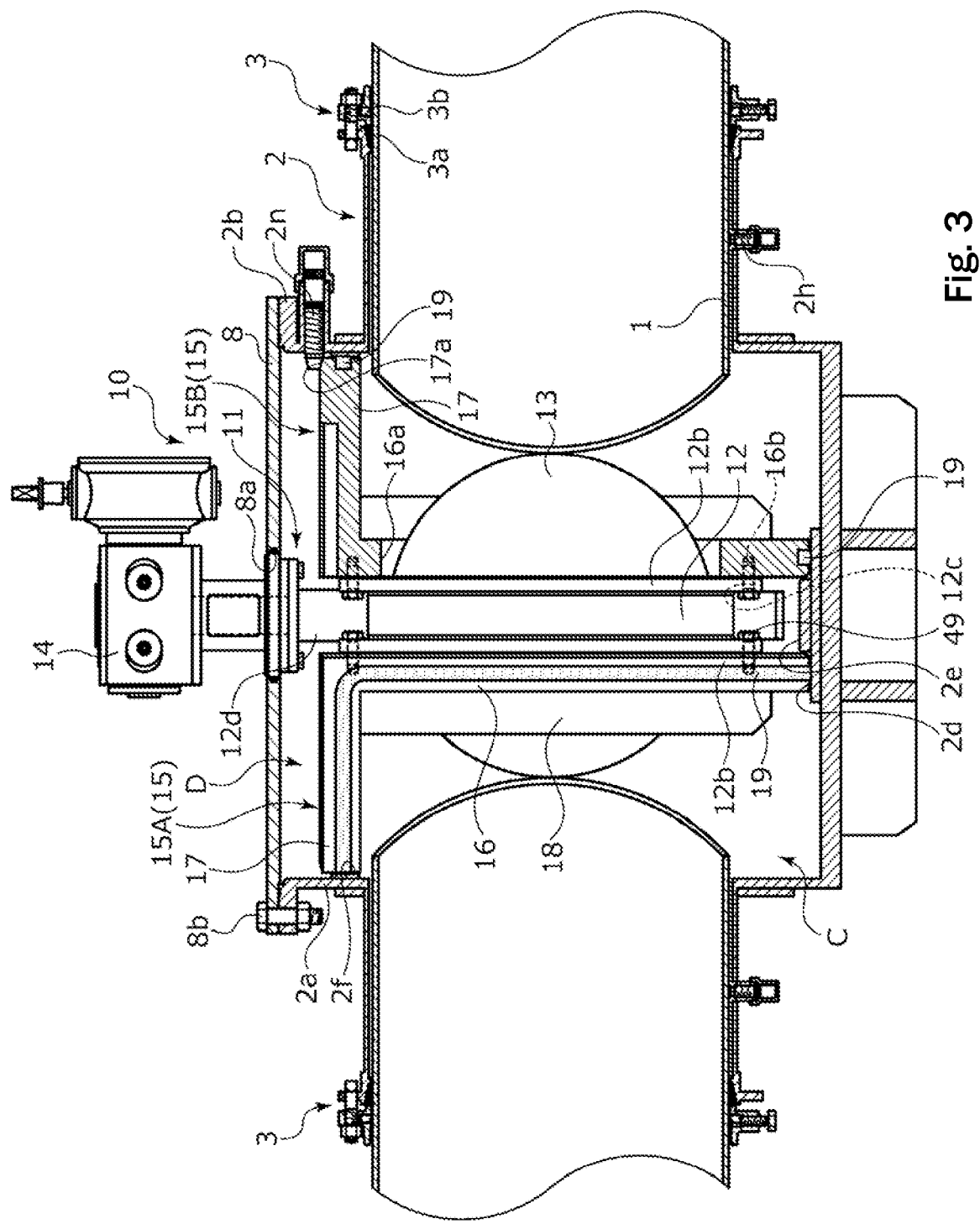
FIG. 3 is a partly-sectional front view showing a state where the fluid control body in the first embodiment is installed in the casing.

As shown in FIG. 2, an on-off valve 9 for draining capable of discharging the fluid to the outside is attached to a bottom portion of the casing 2. Thus, it is possible to flush out chips generated at the time of cutting off the fluid pipe 1 by the cutter 52 to the outside together with the fluid.

When the fluid pipe 1 is cut off by the cutter 52, a coupon cut out of the fluid pipe 1 are held in the cutter 52. By pulling the cutter 52 up to the inside of the attachment flange cylinder 51 together with the coupon and closing the branch portion 2a by the valve element of the process valve 4, a cut-off task of the fluid pipe 1 is completed.

Next, as shown in FIG. 2, a process of installing the fluid control body 10 in an uninterrupted flow state at the point where the fluid pipe 1 is cut off in the casing 2 will be described. First, while in a state where the branch portion 2a is closed by the valve element of the process valve 4, an inserting machine 6 to which the fluid control body 10 is connected is attached to an upper portion of the process valve 4 in a sealed state. The inserting machine 6 is formed mainly by a cylindrical member 61 formed to pass through in the up and down direction, the cylindrical member inside which the fluid control body 10 is arranged, and a drive mechanism 63 for moving this fluid control body 10 in the up and down direction.

Next, as shown in FIG. 3, the fluid control body 10 according to the present embodiment will be described. The fluid control body 10 is formed mainly by a butterfly valve 11 serving as an on-off valve which is a versatile standardized or commercialized product, and partition bodies 15 mounted on this butterfly valve 11 by connection tools 49 such as bolts.

Further, as shown in FIGS. 3 to 6, the butterfly valve 11 includes a valve seat body 12 formed to have an opening in which an opening portion 12a formed in a substantially circular shape in a front view passes through front and back surfaces, a valve element 13 pivotally supported in the valve seat body 12 in such a manner that this opening portion 12a can be opened or closed in a sealed manner, that is, openable/closable, and a valve shaft at an upper end of the valve seat body 12, a flange for attaching the operation portion 14, and an operation portion 14 coupled to a shaft portion 12d serving as a neck portion which is formed by a cylinder body surrounding the valve shaft, etc. for operating this valve element 13 to open/close. These major parts are standardized or commercial products made of cast iron which is suitable for mass-production in the present embodiment. Further, coating and materials of the parts are also standardized or commercial products having specifications suitable for mass-production and regions where the parts are used. A pair of flange portions 12b, 12b is provided on the front and back sides of the valve seat body 12 to enclose the opening portion 12a in the circumferential direction. Further, plural bolt holes 12c are formed to pass through this flange portion 12b along the circumferential direction. Therefore, with this butterfly valve 11, this flange portion 12b and a flange of the fluid pipe (not shown) can be connected by bolts. For example, the butterfly valve 11 is widely applicable to water supply pipes, sewer pipes, submarine pipes, and various fluid pipes of shipbuilding yards, electric power plants, etc. The opening portion 12a of the butterfly valve 11 applied in the present embodiment is arranged substantially concentrically to the center of the fluid pipe 1, and has the approximately same opening diameter as an inner diameter of the fluid pipe 1. Connection of the butterfly valve 11 to the fluid pipe is not limited to flange connection but may have a structure in which connection is made to have male/female fitting, for example.

By having a water re-filling hole in a valve wing portion of the valve element 13 and having the valve element 13 of a small opening degree, the butterfly valve 11 is preferably a water re-filling type butterfly valve with which the fluid can safely pass through to the downstream side while controlling the fluid by a small amount by the water charging hole. By doing so, a conventional bypass pipe providing communication between the upstream side and the downstream side of the valve is eliminated, so that it is possible to downsize and simplify the casing. Valves other than the water re-filling type valve are also applicable as a matter of course.

In the present embodiment, the butterfly valve 11 is shown as the on-off valve. However, the present invention is not limited to this but the on-off valve may be a sluice valve, a ball valve, or a switching valve, etc.

Next, the partition bodies 15 have a divided structure in which a pair of partition bodies 15A, 15B is attached to the flange portions 12b of the valve seat body 12 of the butterfly valve 11 on the front and back sides in the pipe axis direction. The partition bodies 15 are mounted and fixed by the connection tools 49 inserted through the bolt holes 12c of the flange portions 12b.

In more detail, as shown in FIGS. 3 to 5 and 7, the partition bodies 15 are formed by the pair of integrated steel components provided in the pipe axis direction, each of the steel components including a wall portion 16 in which a through hole 16a communicating with the opening portion 12a of the butterfly valve 11 substantially concentrically with the approximately same diameter is formed to pass through, and plural bottomed female screw holes 16b are provided around this through hole 16a, and a lid portion 17 provided continuously to this wall portion 16 along the circumferential direction of an inner peripheral surface of the branch portion 2a of the casing. This wall portion 16 has a shape extending outward and downward with respect to the valve seat body 12 of the butterfly valve 11, and is provided at a position eccentric to one side with respect to the center of the lid portion 17.

Figure 7A:
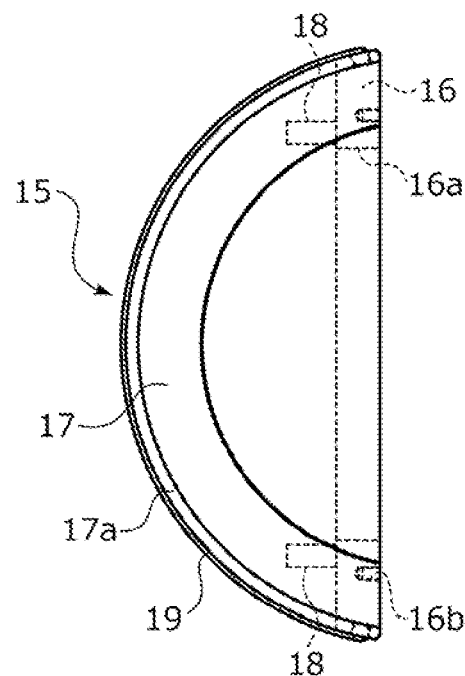
FIG. 7A is a plan view.
Figure 7B:
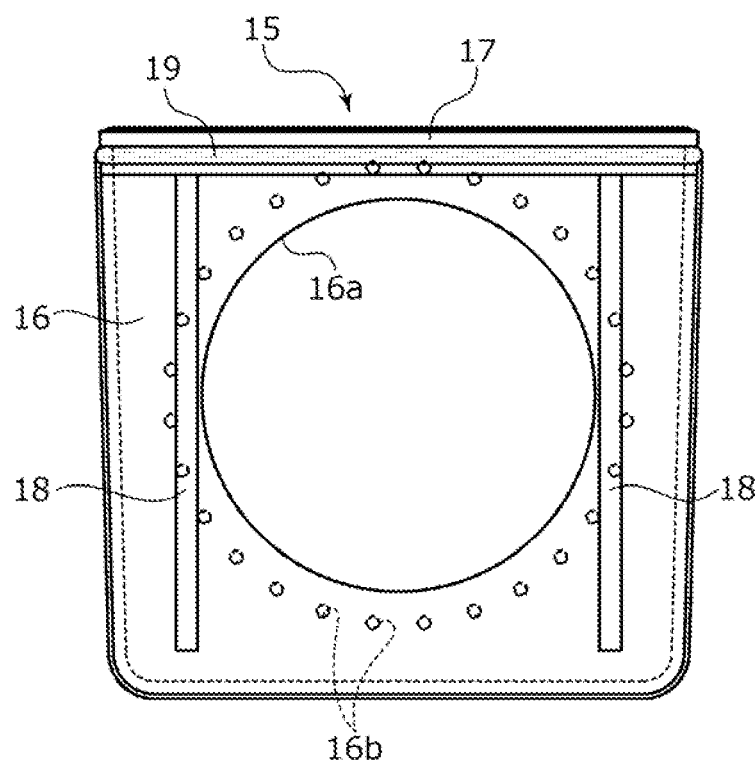
FIG. 7B is a side view.
Figure 7C:
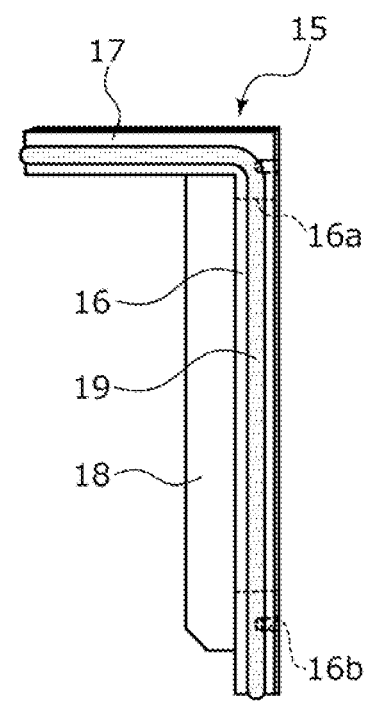
FIG. 7C is a front view.

As shown in FIGS. 7A and 7B, by providing and fixing rib components 18 over the wall portion 16 and the lid portion 17 on both the left and right sides across the through hole 16a, rigidity of the whole partition body 15 is enhanced and a flow of the fluid when the opening portion 12a is opened is guided.

In the partition body 15, a groove portion formed in a substantially U shape in a sectional view is continuously formed over an outer side surface and a lower surface of the wall portion 16 and an outer peripheral surface of the lid portion 17, and an endless seal component 19 is arranged in this groove portion. Further, on the inner peripheral side of the connection tools 49 inserted through the flange portion 12b of the valve seat body 12, although not limited only to the inner peripheral side, an annular sealing member (not shown) is placed between an end surface of the valve seat body 12 in the pipe axis direction and a wall surface of the wall portion 16 opposing this end surface to enclose the opening portion 12a. The seal component 19 and the sealing member are made of elastic members of rubber, elastomer, resin, etc. including NBR, SBR, CR.

As shown in FIG. 2, a valve suspending tool 64 coupled to the drive mechanism 63 is connected to an upper end of the fluid control body 10 formed by the butterfly valve 11 and the partition bodies 15 described above by bolts (not shown), and the fluid control body 10 is inserted downward to the point where the fluid pipe 1 is cut off in the casing 2 by the drive mechanism 63.

Figure 4:
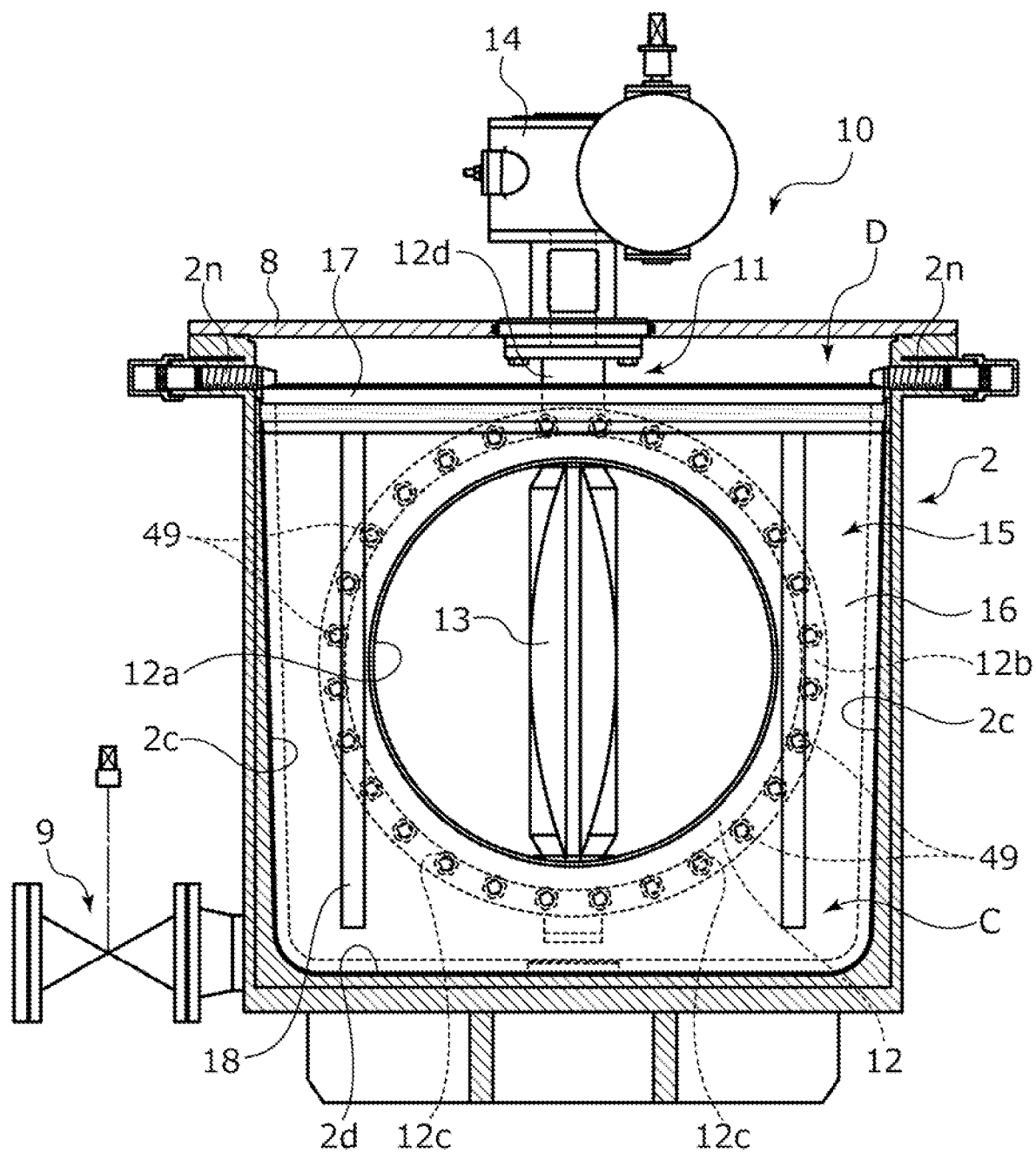
FIG. 4 is a partly-sectional side view as well as FIG. 3.
Figure 5:
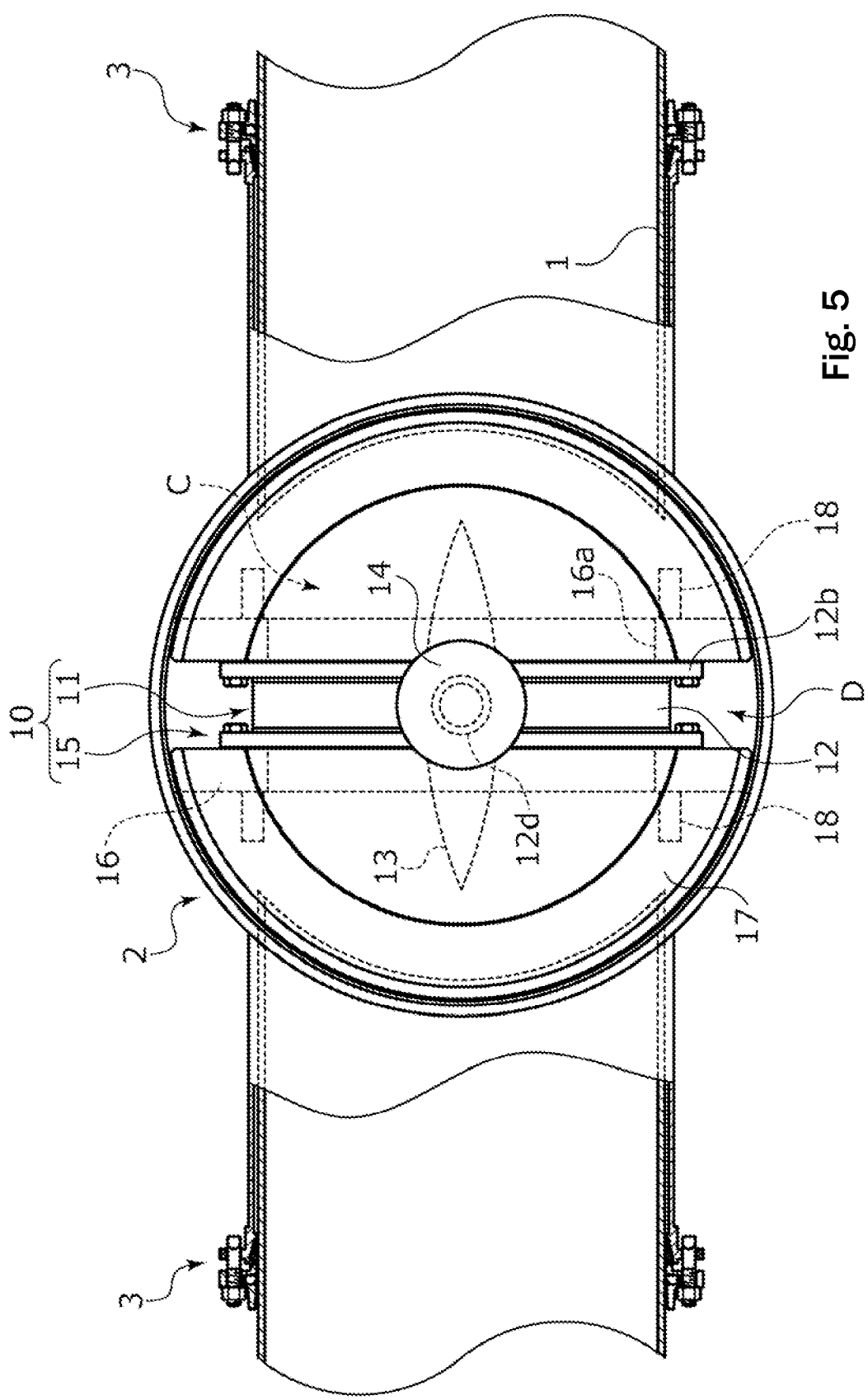
FIG. 5 is a partly-sectional plan view as well as FIG. 3.
Figure 6A:
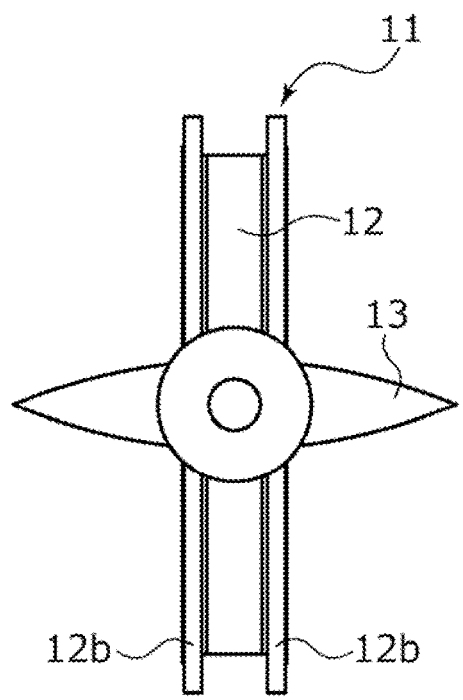
FIG. 6A is a plan view.
Figure 6B:
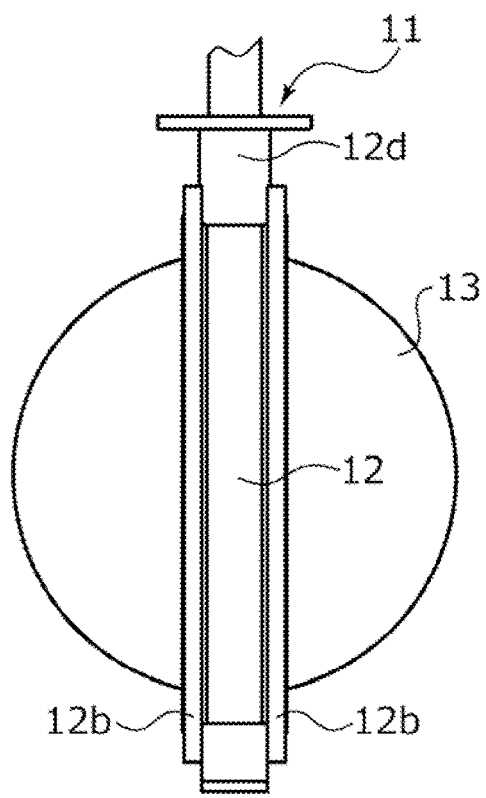
FIG. 6B is a front view.
Figure 6C:
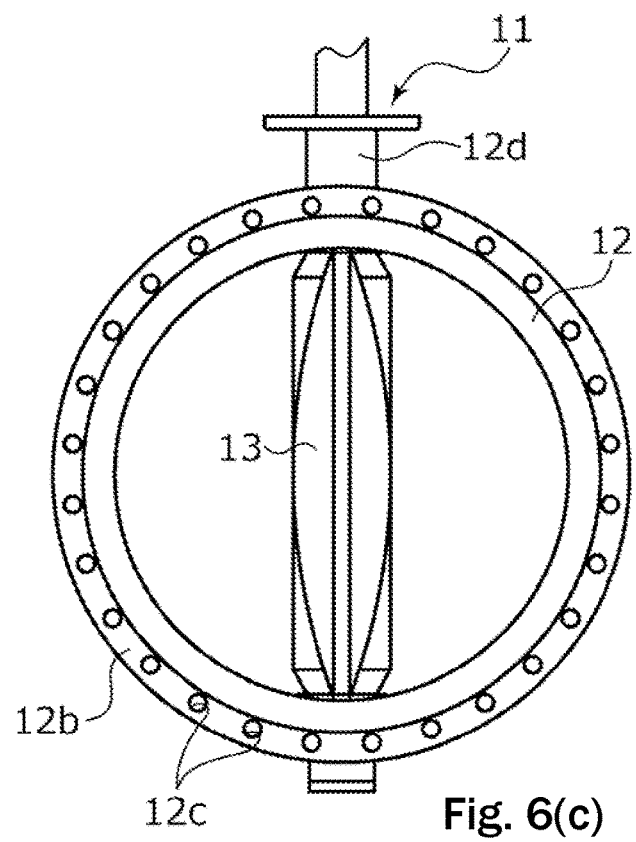
FIG. 6C is a side view.

As shown in FIG. 4, side wall step portions 2c, 2c serving as seal seat portions which project to the inner side of the casing 2 with respect to the other parts are formed on side portion inner wall surfaces of the casing 2 to oppose each other. This side wall step portion 2c is extended to oppose the seal component 19 described above in a tapered shape to gradually come close to each other to the lower side. Therefore, at the time of inserting the fluid control body 10 into the casing 2, the fluid control body 10 is inserted into the casing 2 in a separated state where a side portion of the seal component 19 provided in the wall portion 16 is close to the side wall step portion 2c. At the same time as the fluid control body 10 is installed in the casing 2, the side portion of the seal component 19 is compressed to the side wall step portion 2c. The side wall step portions 2c, 2c are not limited to projection forming but may be flush with another inner surface without projecting or be a recessed portion.

As shown in FIG. 3, at the time of inserting the fluid control body 10 into the casing 2 by predetermined depth, bottom portions of the seal components 19 provided in the wall portions 16 are compressed to a bottom wall step portion 2d serving as a seal seat portion which is formed to project on a bottom surface of the casing 2, and lower end portions of the wall portions 16 of the pair of partition bodies 15 provided to sandwich the butterfly valve 11 in the pipe axis direction are fitted to a projected portion 2e projecting upward in the center of the bottom wall step portion 2d of the casing 2 while leaving some allowance. Thereby, it is possible to prevent inclination of the fluid control body 10 with respect to the casing 2 at the time of an insertion task and after insertion, and it is possible to maintain a sealing property against pressure fluctuation and flow rate fluctuation of a fluid in a pipe. The projected portion 2e may be extended to the upper portion side of the casing 2 to guide at the time of inserting the fluid control body 10. At the time of inserting the fluid control body 10 into the casing 2 by predetermined depth, the seal components 19 provided in the lid portions 17 are compressed to a peripheral wall step portion 2f serving as a seal seat portion which projects inward of the branch portion 2a. The bottom wall step portion 2d and the peripheral wall step portion 2f are not limited to projection forming but may be flush with another inner surface without projecting or be a recessed portion.

In such a way, since the side wall step portions 2c and the bottom wall step portion 2d serving as the seal seat portions project on an inner surface of the casing 2, it is possible to suppress the chips generated at the time of cutting off the fluid pipe from adhering to the seal seat portions. Thus, it is possible to improve the sealing property and the structure is more preferable.

Next, plural fixing screws 2n provided in the circumferential direction of the branch portion 2a of the casing 2, the fixing screws being capable of going forward and backward in the radial direction go forward in the inner diameter direction of the branch portion 2a. Thereby, the fixing screws 2n hold the lid portion 17 to press from the upper side against fluid pressure in the casing 2, and it is possible to prevent the fluid control body 10 from drawing out of the branch portion 2a. Leading end portions of the fixing screws 2n are formed in a tapered shape, and the leading end portions of the fixing screws 2n are brought into sliding contact with an inclined surface 17a formed in an outer peripheral edge of an upper surface of the lid portion 17. Thus, it is possible to correct inclination of the lid portion 17, that is, of the fluid control body 20 to some extent.

By pressing the lid portion 17 from the upper side by the fixing screws 2n in such a way, it is possible to detach the inserting machine 6 formed by the cylindrical member 61 and the drive mechanism 63, the valve suspending tool 64, and the process valve 4 from the casing 2.

By installing the fluid control body 10 in the casing 2 in such a way, by the seal components 19 provided in the fluid control body 10 and the sealing member described above, the inside of the casing 2 is partitioned into an inside region C communicating with the inside of the fluid pipe 1 and forming a flow passage, and an outside region D excluding this inside region C in a sealed manner. Next, inside the casing 2, the fluid remaining in the outside region D is suctioned and removed by a pump (not shown) to make the outside region D a void space where no fluid in a pipe exists. By doing so, even in a case where for example a standardized or commercialized product is used straightaway as the butterfly valve 11, and even with standardized coating, the butterfly valve 11 is brought into contact with the fluid in the pipe only in time which is the time of inserting, and after insertion, installed in the casing 2 in a dry state and in a state where the butterfly valve 11 is protected from contact with heavy machineries. Thus, corrosion resistance, accident prevention, and leakage prevention are excellent. The butterfly valve 11 may be arranged in the outside region D while coating of a part of the butterfly valve 11 to be in contact with the fluid may be changed to coating suitable for the fluid.

Next, an annular lid member 8 having an integrated or divided structure in which a through hole 8a is formed in the center in a top view is fixed to the flange 2b of the branch portion 2a in a sealed manner by a bolt-nut 8b. In the lid member 8, a lower portion of the operation portion 14 of the fluid control body 10 is inserted through the through hole 8a, and a sealing ring that seals a part from the lower portion of the operation portion 14 is provided, so that the lid member 8 preferably prevents the fluid control body 10 from drawing out of the branch portion 2a together with the fixing screws 2n. Thereby, installment of the fluid control body 10 into the casing 2 is completed.

In such a way, as the fluid control body 10 installed in the casing 2 which is fitted onto the fluid pipe 1 in a sealed manner, the butterfly valve 11 (on-off valve) formed by the valve seat body 12 and the valve element that opens/closes the opening portion 12a, and the partition bodies 15 formed by the wall portions 16 which are mounted on the valve seat body 12 and the lid portions 17 covering an opening of the casing 2 on the branch portion 2a side, the partition bodies including the seal components 19 that seal parts from the inner surface of this casing 2 are formed separately from each other. Thus, without requiring a fluid control body whose details are designed and manufactured according to a shape of the casing 2, it is possible to adopt a standardized or commercialized product which is highly versatile as the butterfly valve 11 (on-off valve) and has desired fluid control properties, and also to hold the sealing property in the casing 2 by the partition bodies 15 placed between this butterfly valve 11 and the inner surface of the casing 2. The partition bodies 15 are formed by the wall portions 16 enclosing the opening portion 12a of the valve seat body 12 and the lid portions 17 provided continuously to the wall portions 16. Thus, structural strength and rigidity of the partition bodies 15 are enhanced and it is possible to maintain the sealing property against pressure fluctuation and flow rate fluctuation of the fluid in the pipe.

By letting the pair of wall portions 16, 16 approach to sandwich the valve seat body 12 of the butterfly valve 11 in the pipe axis direction, it is possible to easily mount these wall portions 16, 16.

Further, by letting the lid portions 17, 17 provided respectively continuously to the pair of wall portions 16, 16 approach in the pipe axis direction, it is possible to easily form as the partition bodies 15.

By endlessly sealing over an inner side surface and an inner bottom surface of the casing 2 and the inner peripheral surface on the branch portion 2a side with the seal components 19 provided in the fluid control body 10, it is possible to enhance the sealing property and avoid a possibility of fluid leakage.

By placing the sealing member that seals the opening portion 12a to enclose the opening portion 12a between the valve seat body 12 and the wall portions 16, it is possible to block a flow of the fluid between the valve seat body 12 and the wall portions 16 by this sealing member. By installing the fluid control body 10 in the casing 2, it is possible to prevent corrosion in a part (such as an outer peripheral part of the flange portions 12b of the butterfly valve 11) coming into contact with the outside region D excluding the inside region C formed as a flow passage.

Figure 8:
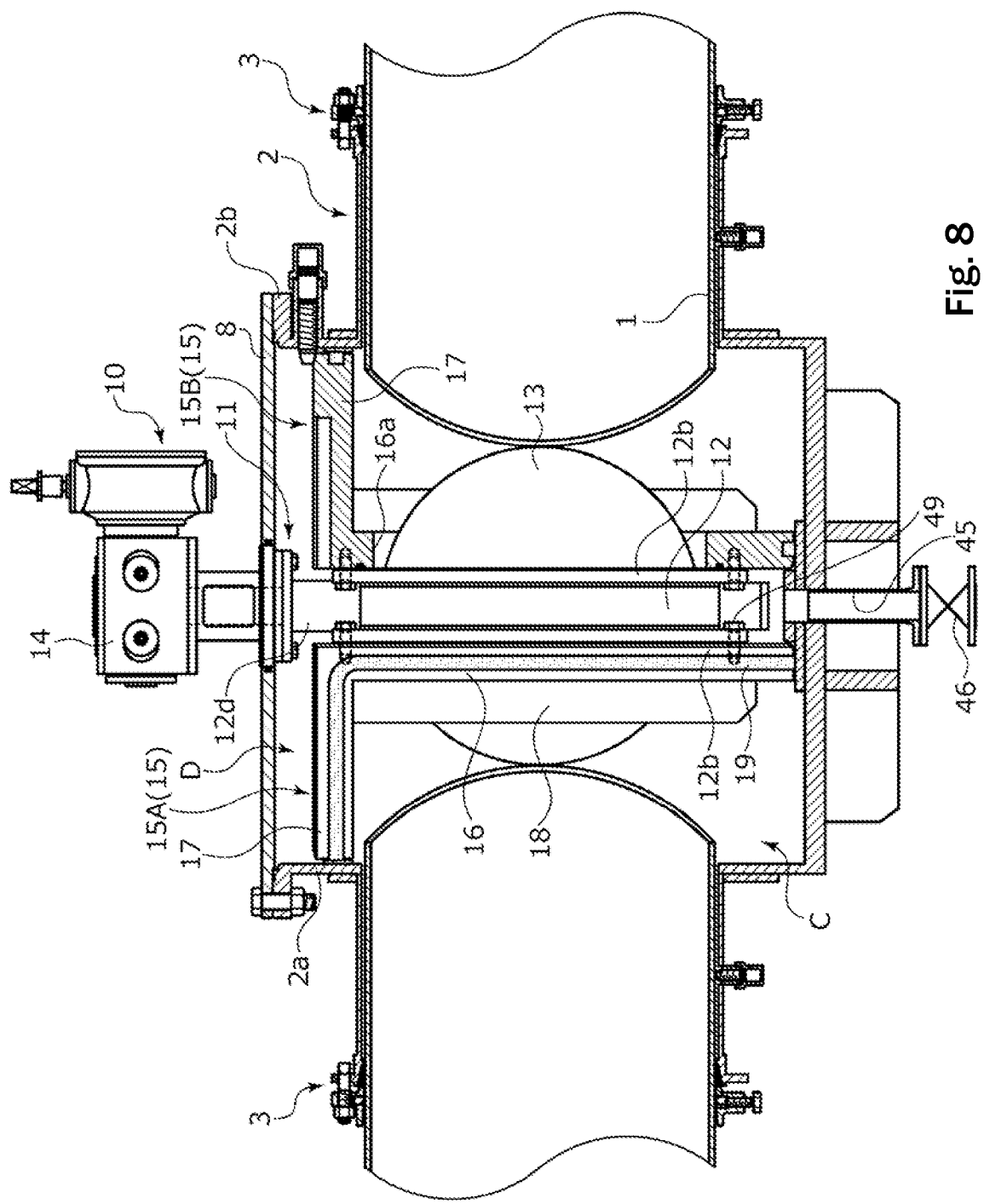
FIG. 8 is a partly-sectional front view showing a modified example of the casing.

In order to remove the fluid remaining in the outside region D, the present invention is not limited to suctioning by the pump described above, etc. For example, as shown in FIG. 8 as a modified example of the casing of the present invention, a drain flow passage 45 communicating with the outside region D and the outside of the casing 2 may be formed at a predetermined point of the projected portion 2e, etc. on the bottom portion side of the casing 2, a valve 46 that opens/closes this drain flow passage 45 may be attached, and the fluid remaining in the outside region D may be discharged to the outside of the casing 2 via the drain flow passage 45 by opening this valve 46.

Figure 9A:
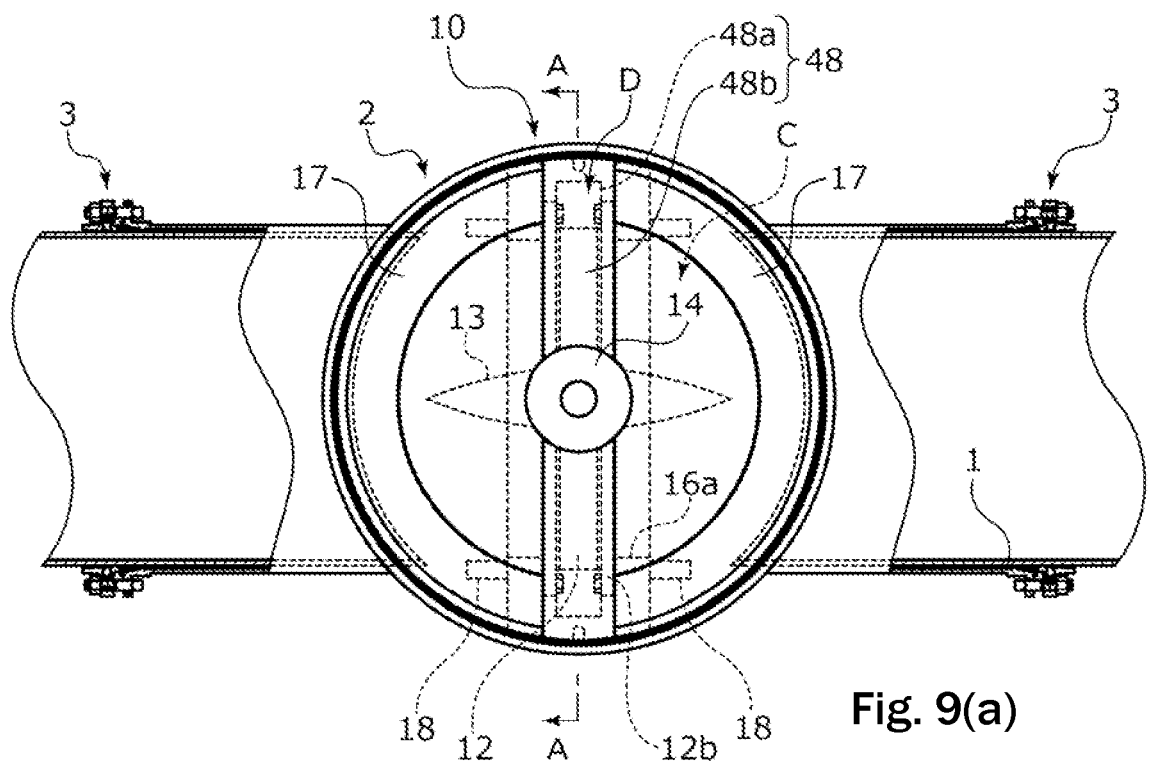
FIG. 9A is a plan view.
Figure 9B:
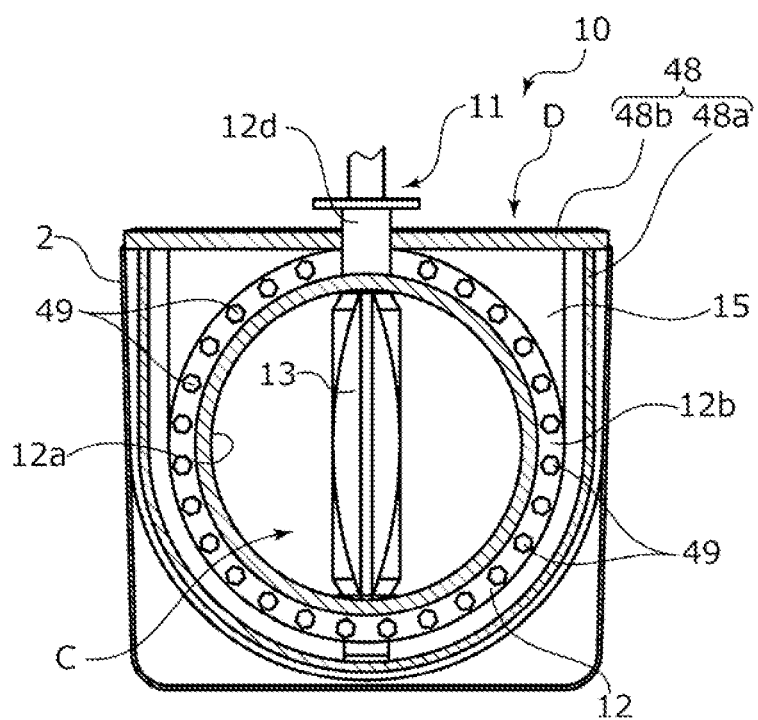
FIG. 9B is a sectional view by the line A-A of FIG. 9A.

In addition, for example, as shown in FIG. 9 as a modified example of the fluid control body of the present invention, a cap component 48 made of an elastic material may be additionally and detachably formed in the fluid control body 10 formed by the butterfly valve 11 and the partition bodies 15. This cap component 48 is attached to an outer surface of the fluid control body 10 described in the first embodiment, and has an outer surface shape to supplement the outside region D formed in a state where the fluid control body 10 of the first embodiment is installed in the casing 2. In more detail, the cap component 48 is formed by a substantially U-shaped integrated lower cap component 48a positioned in left and right regions of the butterfly valve 11 in the outside region D, and divided upper cap components 48b detachable from this lower cap component 48a, the upper cap components being positioned in regions opposing the pair of lid portions 17, 17 and divided in the center.

By installing the fluid control body 10 added with the cap component 48 which has the outer surface shape to supplement the outside region D in the casing 2 in such a way, it is possible not only to protect the fluid control body 10 and the casing 2 without damages at the time of installment but also to reduce an amount of the fluid in contact with and remaining in the outside region D to a large extent. It is also possible to suppress a possibility that mainly outer surface coating of the butterfly valve 11 of the standardized or commercialized product with standard coating is brought into contact with the fluid in the pipe and melt away.

After the fluid control body 10 to which the cap component 48 is attached is installed in the casing 2, the upper cap components 48b are first detached from this fluid control body 10, and then the lower cap component 48a is pulled out and detached from any of the left and right sides of the butterfly valve 11. The present invention is not necessarily limited to detachment of the cap component 48 from the fluid control body 10 but the fluid control body 10 may be left with the cap component 48 being attached in the casing 2. Further, the present invention is not limited to the cap component 48 made of an elastic material but metal or resin may be combined with an elastic body, for example, the cap component 48 may be attached to the butterfly valve 11 or the partition bodies 15 in a sealed manner by using bolts, etc. In addition, for example, the outside region D may be filled and solidified with a thermoplastic substance, a thermosetting resin, a filler, a two-component hardener, an adhesive, etc.

Second Embodiment

Next, a fluid control device according to a second embodiment will be described with reference to FIGS. 10 to 11. The same configurations as the embodiment described above will not be repeatedly described.

Figure 10A:
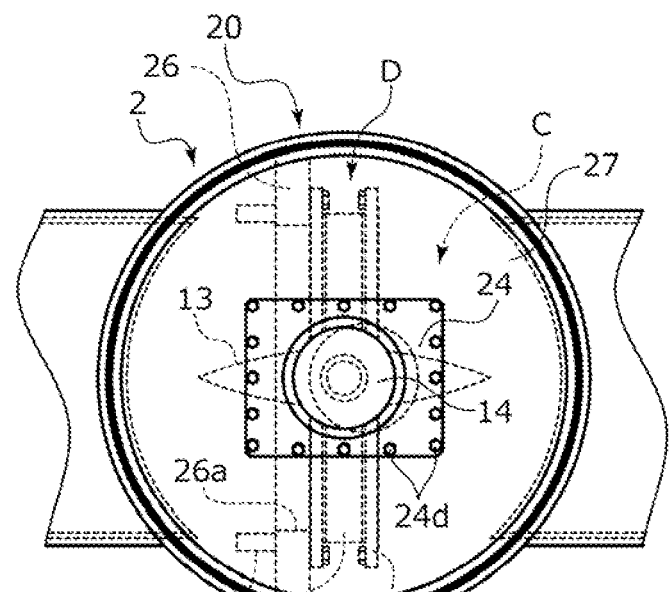
FIG. 10A is a plan view.

As shown in FIG. 10, in a fluid control body 20 of the second embodiment, a partition body 25 having a different shape from the partition bodies 15 of the first embodiment described above is mounted on the butterfly valve 11 described above.

In more detail, as shown in FIG. 11, the partition body 25 is formed by an integrated steel component including a wall portion 26 in which a through hole 26a arranged substantially concentrically to an opening portion 12a of the butterfly valve 11 with the approximately same diameter as that of the opening portion 12a is formed to pass through, the wall portion including plural bottomed female screw holes 26b around this through hole 26a, and a lid portion 27 provided continuously to this wall portion 26, the lid portion having a substantially circular outer shape provided along and over the entire circumference of an inner peripheral surface of the branch portion 2a of a casing.

This wall portion 26 has a shape extending outward and downward with respect to a valve seat body 12 of the butterfly valve 11, and is provided at a position eccentric to one side with respect to the center of the lid portion 27. That is, the wall portion 26 is attached only to one end surface of the valve seat body 12 (end surface on the left side in the figure). The lid portion 27 includes a substantially circular axial hole 27a formed to pass through and have a larger diameter than that of a shaft portion 12d in a plan view at a point adjacent to the wall portion 26, that is, a position eccentric to the other side with respect to the center of the lid portion 27. The present invention is not limited to the wall portion 26 provided at the position eccentric with respect to the center of the lid portion 27 but the wall portion 26 may be provided at a center position of the lid portion 27.

Figure 11A:
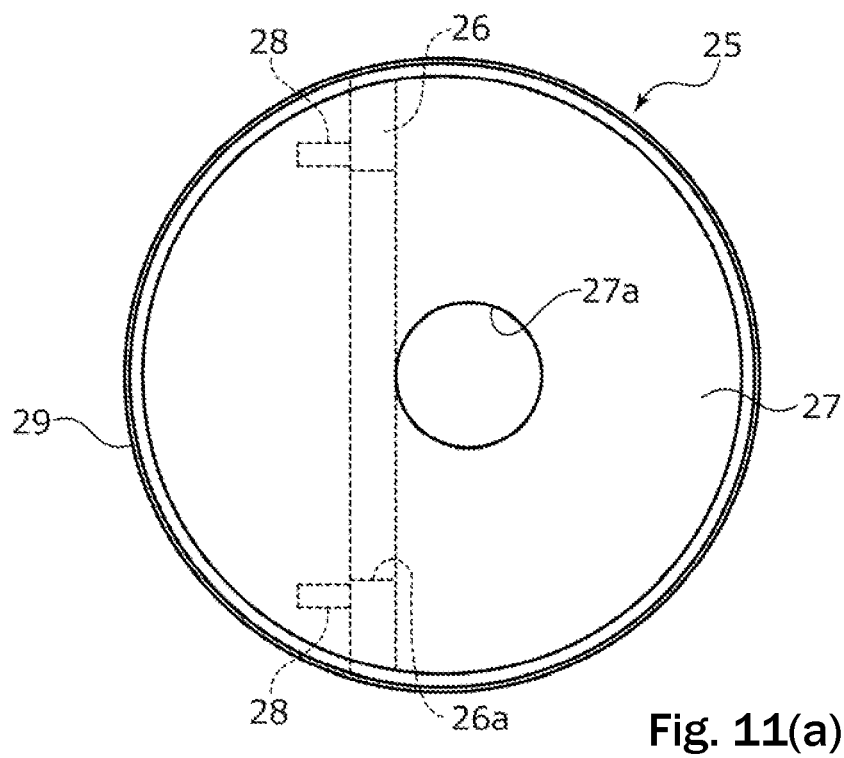
FIG. 11A is a plan view.

As shown in FIG. 11A, by providing and fixing rib components 28 over the wall portion 26 and the lid portion 27, rigidity of the whole partition body 25 is enhanced and a flow of the fluid when the opening portion 12a is opened is guided.

In the partition body 25, a groove portion formed in a substantially U shape in a sectional view is continuously formed over an outer side surface and a lower surface of the wall portion 26 and an outer peripheral surface of the lid portion 27, and an endless seal component 29 is arranged in this groove portion. Further, on the inner peripheral side of connection tools 49 inserted through a flange portion 12b of the valve seat body 12, although not limited only to the inner peripheral side, an annular sealing member (not shown) is placed between an end surface of the valve seat body 12 in the pipe axis direction and a wall surface of the wall portion 26 opposing this end surface to enclose the opening portion 12a. The seal component 29 and the sealing member are made of elastic members of rubber, elastomer, resin, etc. including NBR, SBR, CR.

Figure 10B:
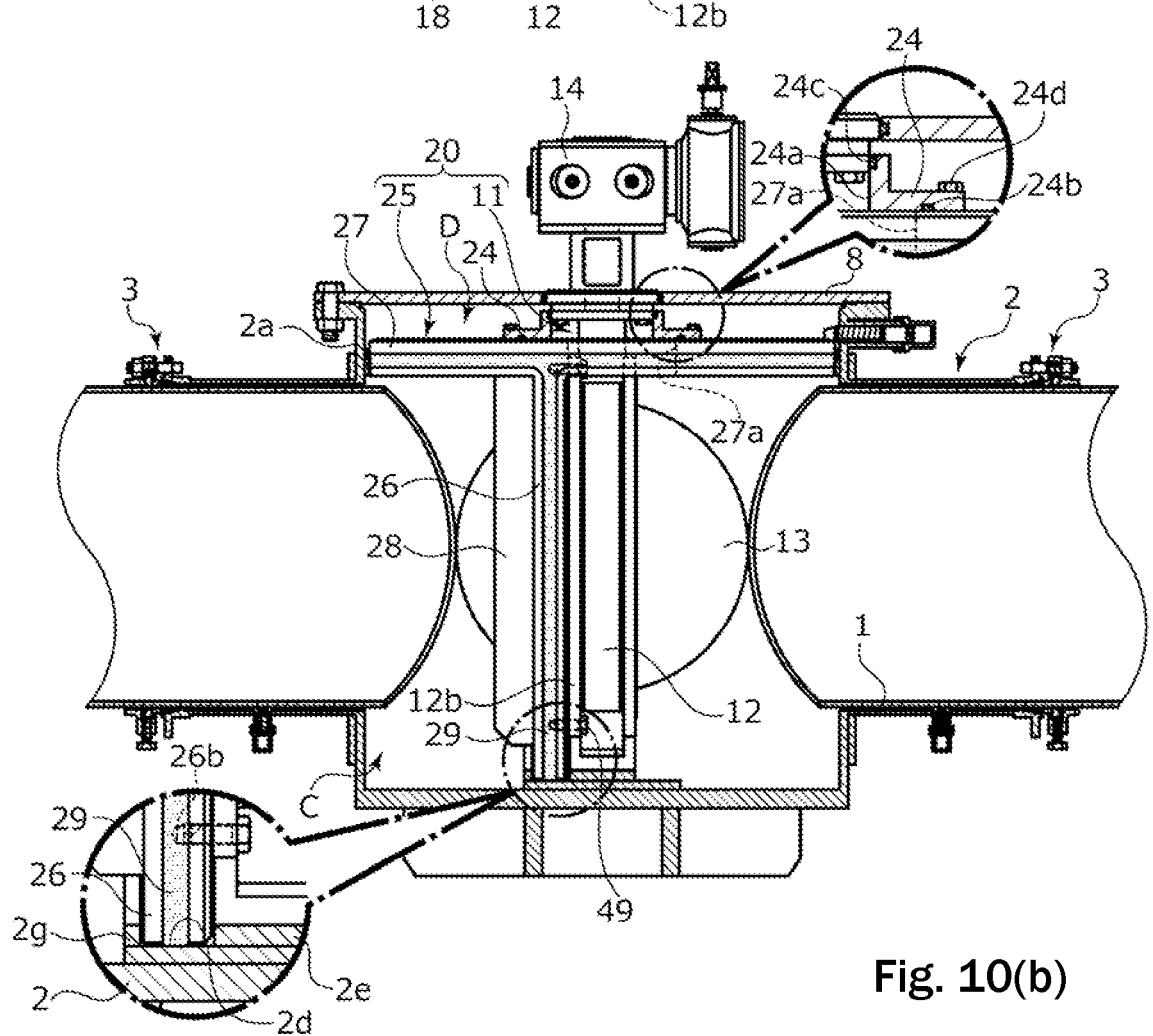
FIG. 10B is a partly-sectional front view.
Figure 11B:
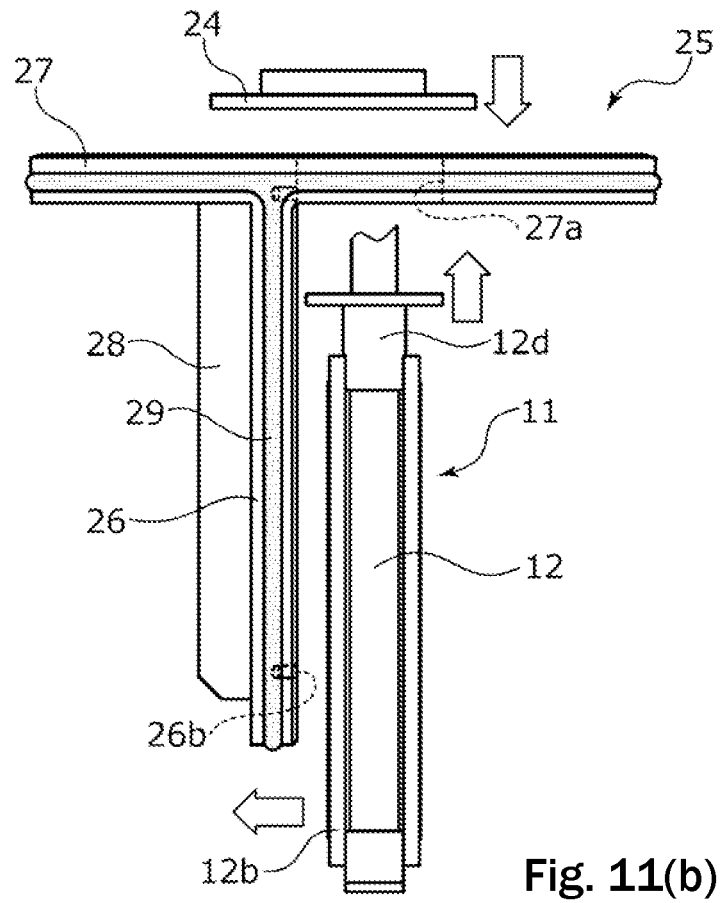
FIG. 11B is a view showing a process of attaching a butterfly valve.

Next, as shown in FIGS. 10 and 11B, a process of attaching the butterfly valve 11 and the partition body 25 will be described. First, the shaft portion 12d of the butterfly valve 11 in a state where an operation portion 14 is detached is inserted through the axial hole 27a from the lower side of the partition body 25. Then, the flange portion 12b of the valve seat body 12 and the wall portion 26 are abutted with each other and these are coupled to each other by the connection tools 49. Further, by a covering lid 24 formed in a rectangular shape in a plan view, the covering lid including a through opening 24a in the center, the upper side of the axial hole 27a is covered in a sealed state. The covering lid 24 is formed to seal an upper surface of the lid portion 27 by an endless seal component 24b provided on a lower surface and to seal the shaft portion 12d of the butterfly valve 11 by an endless seal component 24c provided on an inner peripheral surface of the through opening 24a, and attached to the upper surface of the lid portion 27 by attachment screws 24d.

As shown in FIG. 10B, in a bottom portion in the casing 2, in addition to a projected portion 2e projecting upward in the center of a bottom wall step portion 2d, a side end projected portion 2g projecting upward is provided in a side end portion of the bottom wall step portion 2d. Between the projected portion 2e and the side end projected portion 2g, a lower end portion of the wall portion 26 of the partition body 25 is fitted while leaving some allowance. Thereby, it is possible to prevent inclination of the fluid control body 20 with respect to the casing 2 at the time of an insertion task and after insertion. The projected portion 2e and the side end projected portion 2g may be extended to the upper portion side of the casing 2 to guide at the time of inserting the fluid control body 10.

In such a way, by forming the partition body 25 by the wall portion 26 and the lid portion 27 integrated with and provided continuously to each other, it is possible to improve the rigidity and a sealing property of the partition body 25.

By forming and sealing the axial hole 27a through which the shaft portion 12d is inserted in the lid portion 27 in such a way, it is possible to operate a valve element 13 in the casing 2 to open/close in a sealed state by the operation portion 14 connected to the shaft portion 12d which is inserted through to the outside of the casing 2 via the axial hole 27a. In a case of the second embodiment, coating of the butterfly valve 11 is desirably changed to coating suitable for a fluid in a pipe.

Third Embodiment

Next, a fluid control device according to a third embodiment will be described with reference to FIGS. 12 to 13. The same configurations as the embodiments described above will not be repeatedly described.

Figure 12A:
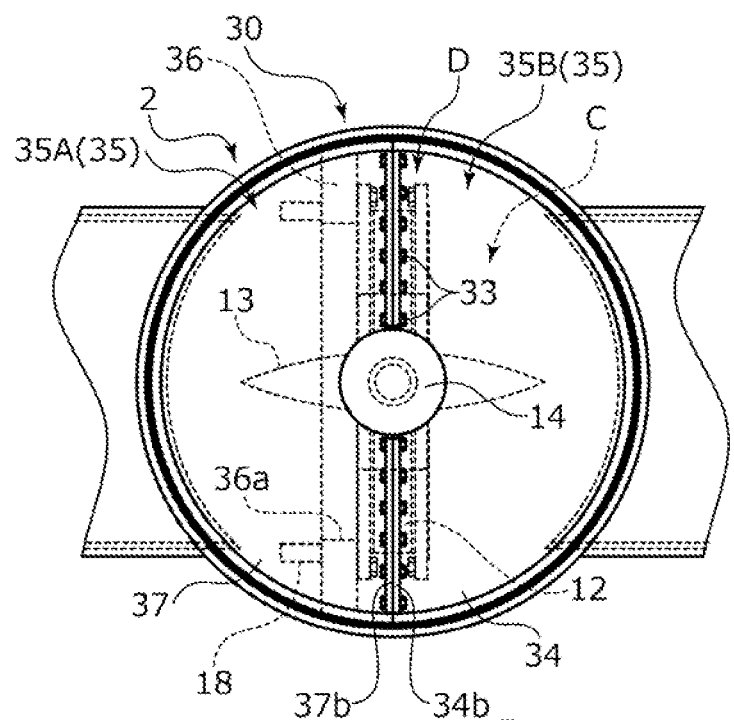
FIG. 12A is a plan view.
Figure 12B:
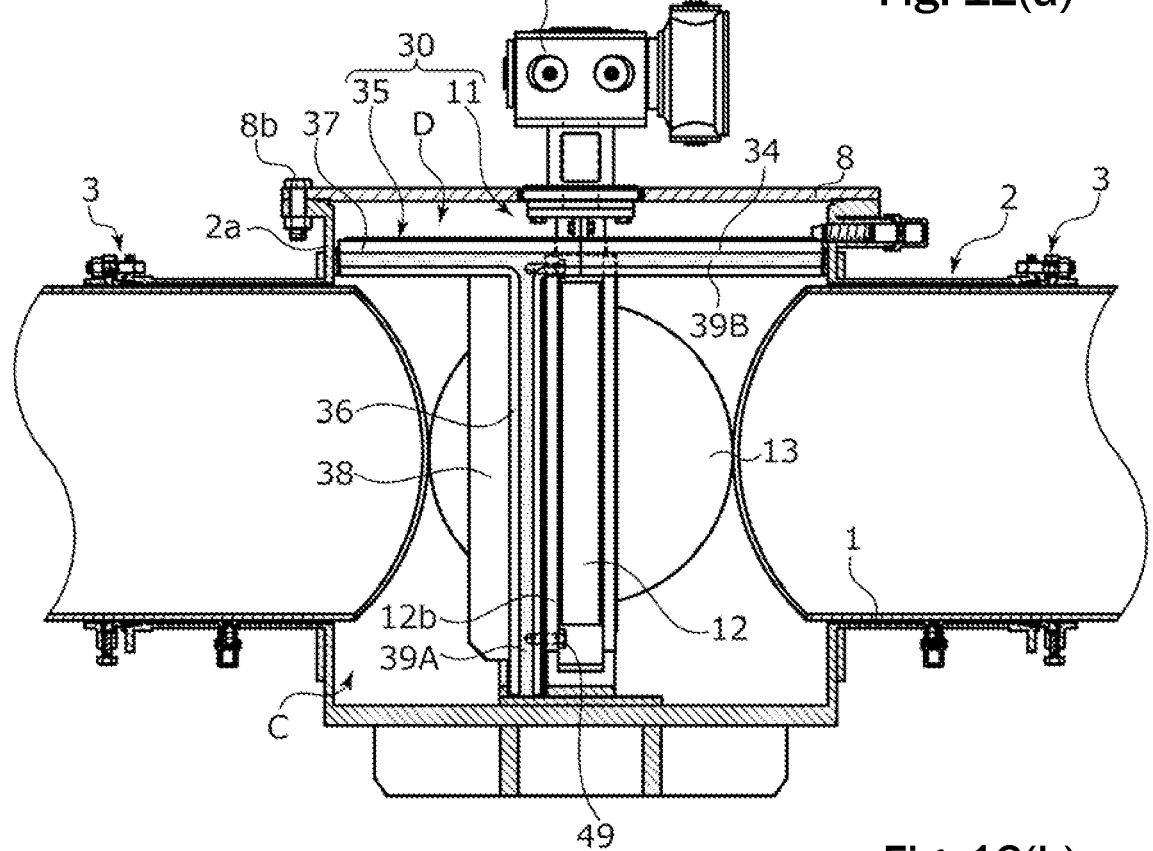
FIG. 12B is a partly-sectional front view.

As shown in FIG. 12, in a fluid control body 30 of the third embodiment, a partition body 35 having a different shape from the partition bodies 15, 25 described above is mounted on the butterfly valve 11 described above.

In more detail, the partition body 35 is formed by an integrated steel component 35A including a wall portion 36 in which a through hole 36a arranged substantially concentrically to an opening portion 12a of the butterfly valve 11 with the approximately same diameter as that of the opening portion 12a is formed to pass through, the wall portion including plural bottomed female screw holes 36b around this through hole 36a, and a lid portion 37 provided continuously to this wall portion 36, the lid portion being provided along substantially half the circumference of an inner peripheral surface of a branch portion 2a of a casing, and a steel component 35B which is a separate body from this steel component 35A, the steel component being formed by only a lid portion 34 which is provided along the remaining substantially-half circumference of the inner peripheral surface of the branch portion 2a of the casing. That is, the partition body 35 of the third embodiment has a divided structure in which the lid portion 27 of the partition body 25 of the second embodiment described above is formed by the lid portion 37 and the lid portion 34.

Figure 13:
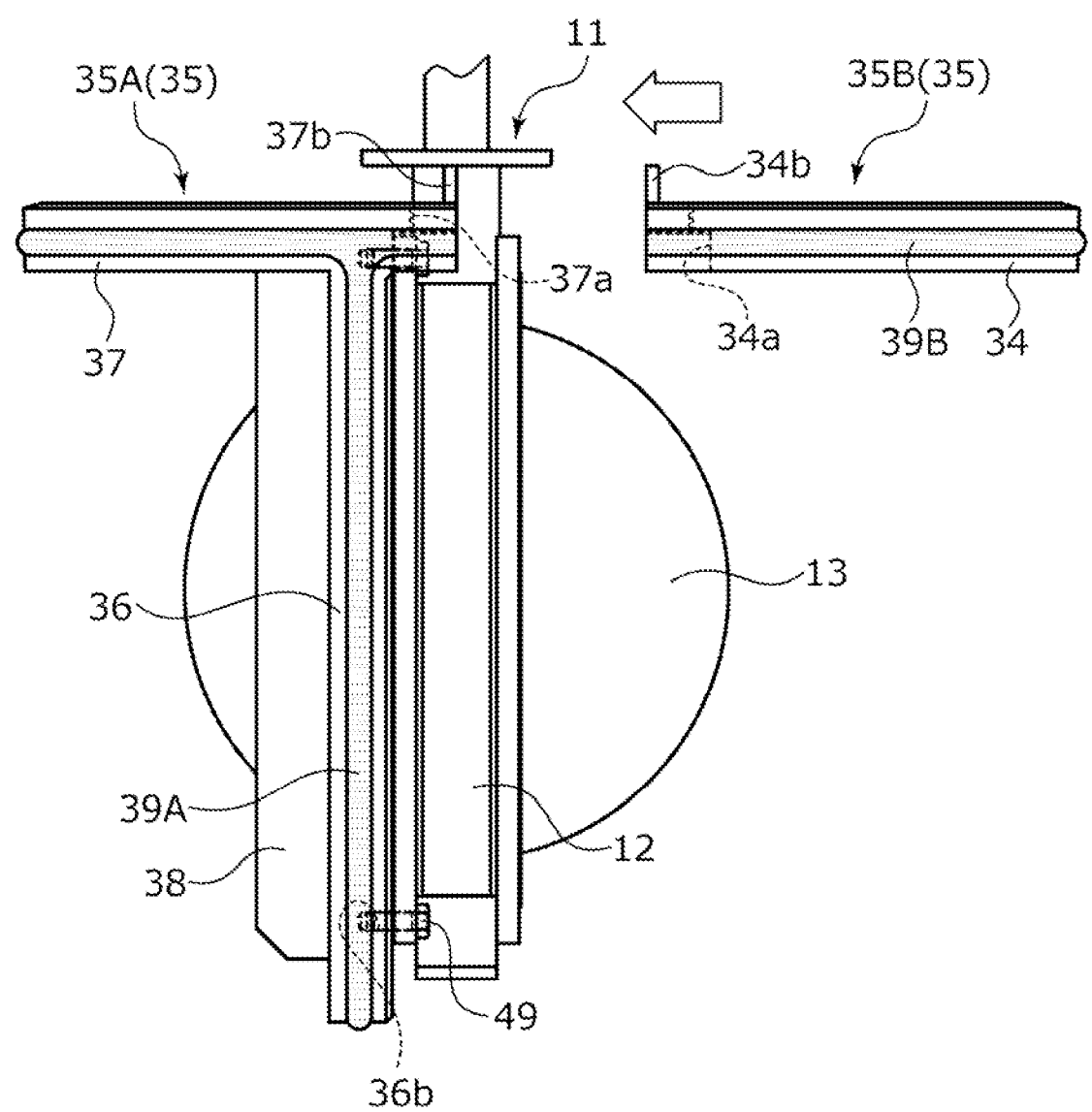
FIG. 13 is a view showing a process of attaching a butterfly valve to a partition body in the third embodiment.

As shown in FIG. 13, the wall portion 36 of the steel component 35A has a shape extending outward and downward with respect to a valve seat body 12 of the butterfly valve 11, and is provided at a position eccentric to one side with respect to the center of the lid portion 37. That is, the wall portion 36 is attached only to one end surface of the valve seat body 12 (end surface on the left side in the figure). The lid portion 37 includes a substantially semicircular cutout hole 37a formed to seal a shaft portion 12d for coupling an operation portion 14 of the butterfly valve 11 at a point adjacent to the wall portion 36, and a flange 37b for connecting to the lid portion 34 which is a separate body is formed in an end portion on the right side in the figure. The present invention is not limited to the wall portion 36 provided at the position eccentric with respect to the center of the lid portion 37 but the wall portion 36 may be provided at a center position of the lid portion 37.

By providing and fixing rib components 38 over the wall portion 36 and the lid portion 37, rigidity of the whole partition body 35 is enhanced and a flow of the fluid when the opening portion 12a is opened is guided.

In the steel component 35A forming the partition body 35, a groove portion formed in a substantially U shape in a sectional view is continuously formed over an outer side surface and a lower surface of the wall portion 36 and an outer peripheral surface of the lid portion 37, and an endless seal component 39A is arranged in this groove portion. Further, on the inner peripheral side of connection tools 49 inserted through a flange portion 12b of the valve seat body 12, although not limited only to the inner peripheral side, an annular sealing member (not shown) is placed between an end surface of the valve seat body 12 in the pipe axis direction and a wall surface of the wall portion 36 opposing this end surface to enclose the opening portion 12a.

Next, the lid portion 34 of the steel component 35B forming the partition body 35 includes a substantially semicircular cutout hole 34a formed to seal the shaft portion 12d for coupling the operation portion 14 of the butterfly valve 11 on the end surface on the left side in the figure, and a flange 34b for connecting to the lid portion 37 which is a separate body is formed in an end portion on the left side in the figure.

In the steel component 35B, a groove portion formed in a substantially U shape in a sectional view is continuously formed over an outer peripheral surface of the lid portion 34, and an endless seal component 39B is arranged in this groove portion. The seal components 39A, 39B and the sealing member are made of elastic members of rubber, elastomer, resin, etc. including NBR, SBR, CR.

Next, as shown in FIG. 13, a process of attaching the butterfly valve 11 and the partition body 35 will be described. First, the shaft portion 12d of the butterfly valve 11 is abutted with the cutout hole 37a from one side of the steel component 35A forming the partition body 35, the flange portion 12b of the valve seat body 12 and the wall portion 36 are abutted with each other, and these are coupled to each other by the connection tools 49. Further, the steel component 35B forming the partition body 35 approaches toward the shaft portion 12d of the butterfly valve 11 from the other side, the shaft portion 12d is abutted with the cutout hole 34a, and an end surface of the steel component 35B is abutted with an end surface of the steel component 35A. That is, by the cutout hole 34a and the cutout hole 37a, an axial hole through which the shaft portion 12d is inserted is formed.

Further, as shown in FIG. 12, by fastening tools 33 inserted through the flange 34b of the lid portion 34 and the flange 37b of the lid portion 37, the lid portion 34 and the lid portion 37 are fastened. In this fastened state, the seal component 39A of the lid portion 34 and the seal component 39B of the lid portion 37 are abutted with each other and also abutted with the shaft portion 12d of the butterfly valve 11 to seal. Sealing members are placed between the lid portion 34 and the lid portion 37 and between the cutout hole 34a, the cutout hole 37a, and the shaft portion 12d, as a matter of course.

By letting the pair of lid portions 34, 37 approach to sandwich the shaft portion 12d for driving the valve element of the butterfly valve 11 in the pipe axis direction in such a way, it is possible not only to easily mount these lid portions 34, 37 but also, as the axial hole is formed by the cutout hole 34a and the cutout hole 37a, to align the pair of lid portions 34, 37 with respect to each other by utilizing the shaft portion 12d. In a case of the third embodiment, coating of the butterfly valve 11 is desirably changed to coating suitable for a fluid in a pipe.

The embodiments of the present invention are described above with the drawings. However, specific configurations are not limited to these embodiments but the present invention includes changes and additions within the range not departing from the gist of the present invention.

For example, in the above embodiments, the butterfly valve 11 serving as the on-off valve is a versatile standardized or commercialized product and major components of the butterfly valve 11 are made of cast iron. However, the present invention is not limited to this but the on-off valve may be a custom-made product or may be made of steel, resin, etc.

In addition, for example, in the above embodiments, the partition bodies 15, 25, 35 are made of steel components. However, the present invention is not limited to this but the partition bodies may be made of cast iron, resin, etc.

In addition, for example, in the above embodiments, the endless seal components 19, 29, 24b, 39A, 39B are formed. However, the present invention is not limited to this but non-endless seal components may be formed and end portions may be adhered to each other, or seal components may be intermittently formed to achieve a sealed state.

Further, for example, in the above embodiments, the butterfly valve 11 has corrosion resistance by coating. However, the present invention is not limited to this but, for example, plating, vulcanization, etc. may be applied as long as that is an effective corrosion resistance treatment.

REFERENCE SIGNS LIST

1 Fluid pipe
2 Casing
4 Process valve
5 Cutting machine
6 Inserting machine
10 Fluid control body
11 Butterfly valve (on-off valve)
12 Valve seat body
12a Opening portion
12d Shaft portion (neck portion)
13 Valve element
14 Operation portion
15 Partition body
16 Wall portion
16a Through hole
17 Lid portion
19 Seal component
20 Fluid control body
25 Partition body
26 Wall portion
26a Through hole
27 Lid portion
27a Axial hole
29 Seal component 30 Fluid control body
34 Lid portion
35 Partition body
36 Wall portion
36a Through hole
37 Lid portion
39A Seal component
39B Seal component

The invention claimed is:

1. A fluid control device comprising a fluid control body that controls a fluid in a pipe, the fluid control body being installed in a sealed manner inside a casing which is externally fitted onto a fluid pipe in a sealed manner at a point where part of the fluid pipe is cut off in an uninterrupted flow state, wherein
   the fluid control body includes
   a standardized commercially available on-off valve as a united device by a valve seat body which includes an opening portion and a valve element which is provided in the valve seat body in such a manner that the opening portion is openable and closable, and
   a partition body which is mounted to the standardized commercially available on-off valve by
      a wall portion that is provided with a through hole communicating with the opening portion, the wall portion being mounted on the valve seat body in a sealed manner, and
      a lid portion which is provided continuously to the wall portion, the lid portion covering an opening side of the casing,
   the partition body including a seal component that seals a gap between an inner surface of the casing and the partition body, wherein
   the wall portion is formed by a pair of wall portions that is mounted to sandwich the valve seat body in an axial direction of the fluid pipe.

2. The fluid control device according to claim 1, wherein the lid portion is provided continuously to each of the pair of wall portions.

3. The fluid control device according to claim 2, wherein an axial hole through which a neck portion of the fluid control body is inserted is formed in the lid portion.

4. The fluid control device according to claim 3, wherein the lid portion is mounted around neck portion in an axial direction of the fluid pipe, and wherein
by connecting the lid portion in the axial direction, the axial hole is formed.

5. The fluid control device according to claim 2, wherein flange bodies are provided on the valve seat body to enclose the opening portion in a circumferential direction.

6. The fluid control device according to claim 1, wherein an axial hole through which a neck portion of the fluid control body is inserted is formed in the lid portion.

7. The fluid control device according to claim 6, wherein flange bodies are provided on the valve seat body to enclose the opening portion in a circumferential direction.

8. The fluid control device according to claim 6, wherein the lid portion is mounted around the neck portion in an axial direction of the fluid pipe, and wherein
by connecting the lid portion in the axial direction, the axial hole is formed.

9. The fluid control device according to claim 8, wherein flange bodies are provided on the valve seat body to enclose the opening portion in a circumferential direction.

10. The fluid control device according to claim 1, wherein flange bodies are provided on the valve seat body to enclose the opening portion in a circumferential direction.

* * * * *